United States Patent [19]

Wetterhorn

[11] 4,006,639
[45] Feb. 8, 1977

[54] TEMPERATURE COMPENSATION FOR LIQUID FILLED PRESSURE GAUGE

[75] Inventor: Richard H. Wetterhorn, Fairfield, Conn.

[73] Assignee: Dresser Industries, Inc., Dallas, Tex.

[22] Filed: Sept. 29, 1975

[21] Appl. No.: 617,356

[52] U.S. Cl. .................................. 73/393; 73/411
[51] Int. Cl.$^2$ ...................... G01L 7/04; G01L 19/04
[58] Field of Search .... 73/393, 418, 416, 411–415, 73/431, 420, 300, 417

[56] References Cited

UNITED STATES PATENTS 3,080,758   3/1963   Decker .............................. 73/414
3,837,225   9/1974   Alinari .............................. 73/300

Primary Examiner—Donald O. Woodiel
Attorney, Agent, or Firm—Daniel Rubin

[57] ABSTRACT

The transparent crystal of a liquid filled pressure gauge casing is physically characterized by a controlled stiffness correlated to the volumetric temperature expansion coefficient of the fill liquid. By virtue of temperature induced expansion of the fluid being accommodated through crystal displacement, affected changes in fluid pressure are substantially minimized in maintaining accuracy of the gauge instrument.

4 Claims, 5 Drawing Figures 4,006,639

TEMPERATURE COMPENSATION FOR LIQUID FILLED PRESSURE GAUGE

BACKGROUND OF THE INVENTION

1. The field of art to which the invention pertains includes measuring and testing art as directed to pressure gauges in which the operating mechanism is completely immersed in a dampening fluid that fills the gauge casing.

2. Pressure gauges and the like containing an oil fill have been widely used and are commercially available from a variety of manufacturing sources. Specific reasons for selecting or requiring an oil filled gauge versus a dry or oil unfilled gauge vary, but generally are attributed to either protecting the working mechanism against corrosion and/or system vibration or pulsation to which the instrument is subjected. Exemplifying liquid filled pressure gauges of the prior art are the disclosures of U.S. Pat. Nos. 3,335,609; 3,370,470; 3,776,041 and 3,874,241.

While such gauges of the prior art are particularly suitable in the applications for which they are expressly intended, a problem which has plagued their use is the instrument error which can result from volumetric expansion of the liquid fill with increases in temperature. That is, any increase (or decrease) in fluid pressure internally of the enclosure caused by volume changes from ambient temperature variations tends to act externally against the Bourdon tube, pressure bellows or the like, tending to distort its operational span from that normally anticipated. This, in turn, results in a false readout of the instrument despite the features of accuracy otherwise built in by the manufacturer. The extent of error per degree temperature change will, of course, vary as a function of various factors such as pressure range of the gauge, rigidity of the enclosure components, effective fluid volume, volumetric temperature coefficient of expansion of the fill fluid, etc. In pressure ranges generally operable below 200 psig, this error can become most significant amounting to as much as 30 percent for a plus 70° F. temperature increase on a 15 psig pressure gauge.

For overcoming this adverse pressure effect of temperature induced expansion various approaches have been proposed, including the use of a controlled air space, elastomeric bladders, diaphragms, etc. contained internally of the enclosure to accommodate volumetric changes with a minimum of pressure buildup. Common to these approaches has been an oversized enclosure required to accommodate the expanded volume of the fluid and/or the additional components intended therefor. Associated with these approaches is the added expense which they almost invariably involve. Despite recognition of the foregoing, a ready solution to the problem has not heretofore been known.

SUMMARY OF THE INVENTION

The invention relates to a temperature compensation construction for a liquid filled pressure gauge and more specifically to a novel construction for avoiding the adverse effects of error that could otherwise be introduced into the gauge readout via temperature induced expansion of the fluid fill. In accordance herewith this is achieved by utilizing a gauge enclosure comprised of a crystal secured fluid-tight to a cup-like case to form an enclosed housing in which the operating mechanism of the gauge is contained. Formed in the casing wall, preferably in the crystal, are one or more localized areas of controlled stiffness correlated to the volumetric temperature expansion coefficient of the fill liquid. By this means, the crystal or whatever portion of the casing is appropriately characterized by the required stiffness is able to perfrom a dual function not only as a component of the case per se but also for absorbing the temperature related volume changes of the fluid without significantly contributing to temperature induced pressure changes in the casing enclosure. Since this same component is able to function in a dual capacity, the increased case volume and/or additional components with associated expense previously required for that purpose are substantially, if not completely, eliminated.

It is therefore an object of the invention to provide a novel form of temperature compensation for liquid filled pressure gauges.

It is a further object of the invention to effect temperature compensation for a liquid filled pressure gauge by affording controlled stiffness properties to an otherwise standard component of the gauge casing construction.

It is a still further object of the invention to effect the foregoing objects by achieving temperature compensation at a minimum cost as compared to similar purpose constructions employed by the prior art.

BRIEF DESCRIPTION OF THE DRAWINGS

Referring now to FIGS. 1–3 and 5 of the drawings, the gauge construction in accordance herewith comprises a gauge casing or enclosure 10 formed of a more or less cup-shaped rear case 12 which at its open end supports a transparent crystal 14. Together, case 12 and crystal 14 house operating mechanism 16 completely immersed in a fluid fill 18 supplied via a post-sealed aperture (not shown) at the top of case 12. Mechanism 16 may comprise a Bourdon tube 20, bellows or the like which receives fluid pressure from a source to be measured via a hollow stem 22. On receipt of pressure changes, the movable or displacement end of tube 20 actuates motion amplifier 24 to drive a pointer 26 relative to a dial plate 28 in a well known manner. By this means, pointer 26 is displaced opposite dial plate 28 relative to graduations 30 thereon indicative of pressure values.

Figure 1:
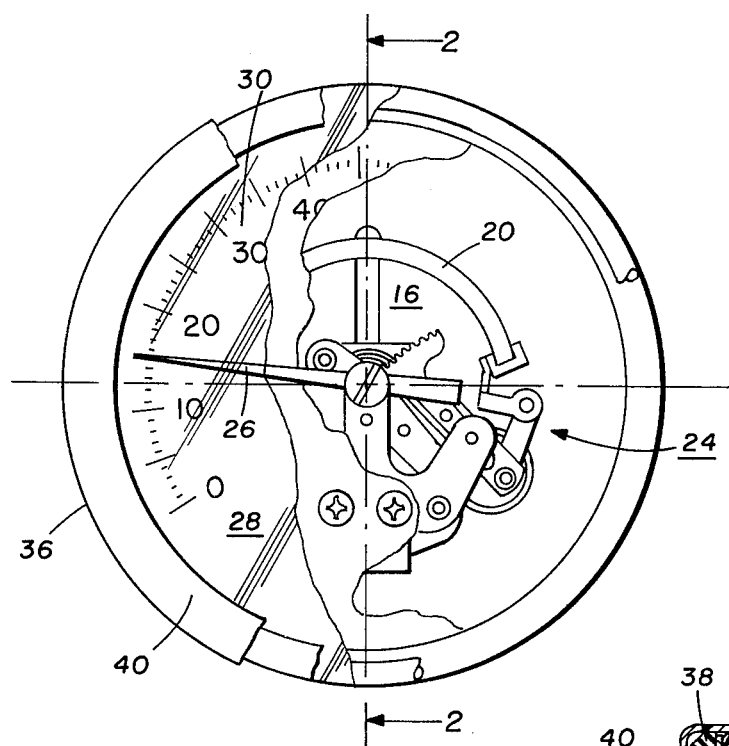
FIG. 1 is a plan view of a liquid filled pressure gauge constructed in accordance herewith.

For supporting cyrstal 14 in fluid-tight relation to case 12, the latter includes an annular flange 32 about its periphery against which is positioned an annular O-ring gasket 34. Secured to flange 32 as by tabs 33 and extending axially forward thereof is a relatively resilient annular ring 36. Positioning the crystal against gasket 34 is a superposed annular, more or less V-section, gasket 38 in turn held in place by a resilient folded over flange 40 of ring 36. Flange 40 exerts sufficient force against gasket 38 as to effect the desired leak-free sealing pressure about crystal 14. Yet in response to any excessive overpressure as might occur via rupture of the Bourdon tube, etc. flange 40 enables pressure release in a manner as disclosed, for example, in U.S. Pat. Nos. 3,795,148 or 3,630,089.

Figure 4:
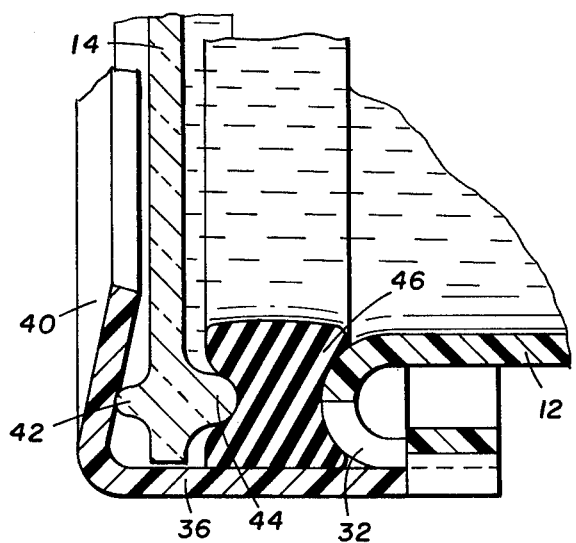
FIG. 4 is an enlarged fragmentary corner section of an alternative embodiment to that of FIG. 3.

In the embodiment of FIG. 4 crystal 14 includes an annular ridge 42 on its topside engaged by the underside of flange 40 and an annular ridge 44 on its bottomside compressing an annular gasket 46 against turned over flange 32. In this arrangement, a further cost reduction is achieved by utilizing a single gasket 46 as compared to the double gaskets 34 and 38 of the previous embodiment.

For effecting temperature compensation in accordance herewith, the essential physical properties of crystal 14 will now be described with specific reference to the curves of FIG. 5 derived for a 3½ inch gauge casing filled and sealed with fluid 18 at 70° F. In the context hereof "internal pressure increase" shall be understood to mean an increase in pressure inside the gauge enclosure with respect to atmospheric pressure. Likewise, for the embodiment being described, "percent volume increase" shall be understood to mean an increase in fluid fill volume equal to 1 percent of the effective surface area of the compensating component in square inches times 1 inch. Moreover, "specific volume stiffness" shall be understood to mean a resistance measure of the gauge enclosures to an internal pressure increase in response to a known percent volume increase induced within the gauge enclosure.

Figure 5:
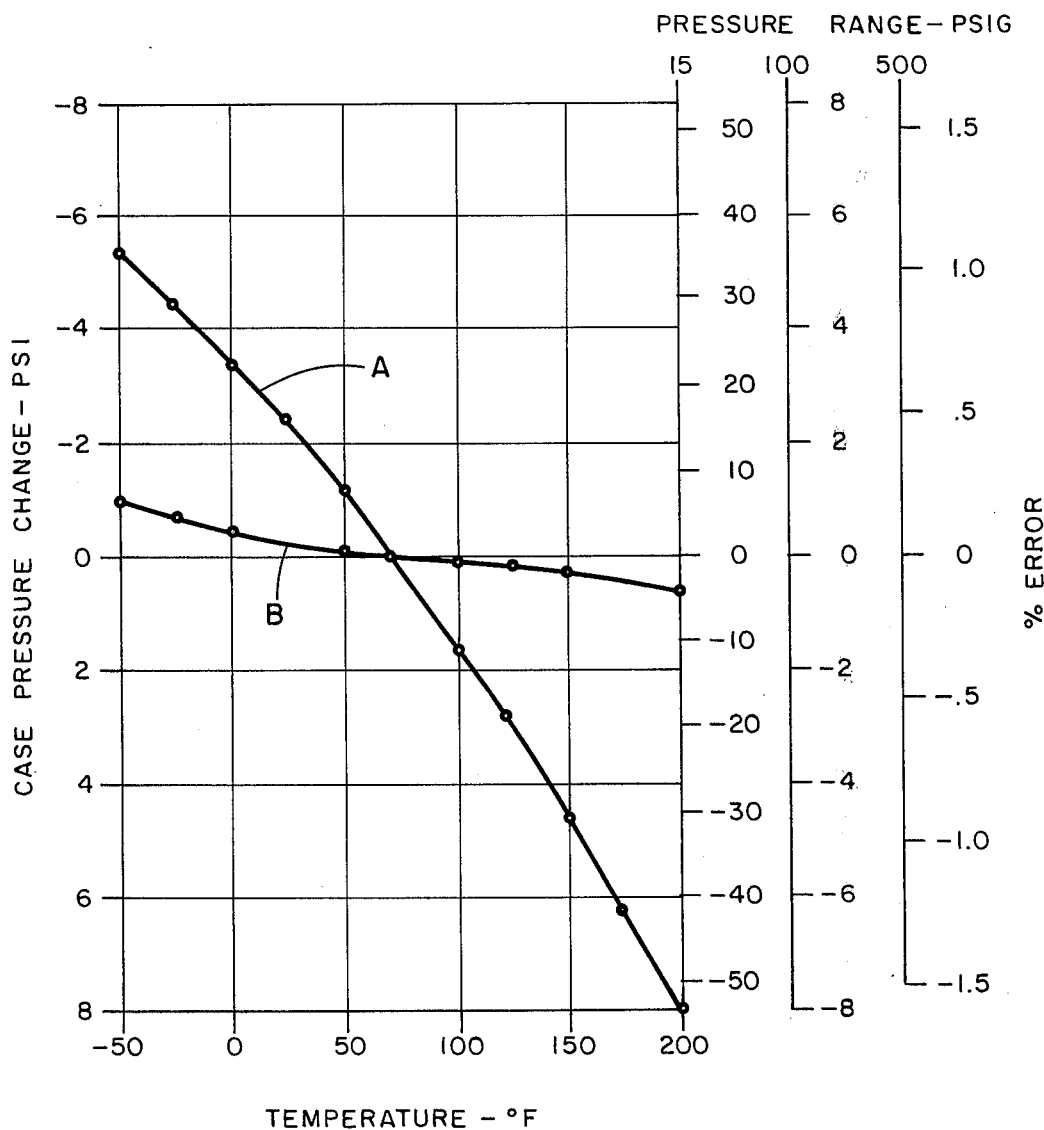
FIG. 5 is a graphical representation of the temperature compensation comparing the effects hereof with that of an uncompensated but otherwise similar construction of the prior art.

Fluid fill 18 can comprise various forms of available fluids and for the curves of FIG. 5 comprises glycerine affording a volumetric thermal coefficient of expansion of $0.269 \times 10^{-3}$ per degree Fahrenheit. Curve A represents a standard prior art crystal composed of plastics such as plexiglass or Lexan on the order of about 0.130 inches thickness which at that diameter has a specific volume stiffness of 6.0 psi per percent volume increase. Lexan is a trademark of the General Electric Co. for a composition of polycarbonate. Curve B in accordance herewith is formed of 0.030 inch thickness Lexan which at that diameter is characterized by a specific volume stiffness of on the order of 0.082 psi per percent volume increase. Preferably, the specific volume stiffness should be less than about 0.1 psi per percent volume increase.

From curve A, it can be seen that at 150° F. buildup inside a conventional gauge construction about a 4½ psi error will be produced in the instrument readout as compared to only about 0.2 psi error in the compensated version of curve B. Speaking in terms of percentage, error for a gauge having a 15 psi range is 30 percent by way of the prior art versus 1.3 percent in accordance herewith thereby reducing the error at 150° F. by a factor of on the order of 22. By comparing the percent error of the pressure ranges indicated on the graph of FIG. 5, it can be seen that the error under consideration is of significantly greater percent in the lower pressure ranges than in the higher pressure ranges. In terms of the foregoing definitions, a temperature increase of 41.6° F. above the glycerine fill temperature would produce a 1 percent volume increase resulting in gauge enclosure pressure increases of 6.0 psi and 0.082 psi in the represented conventional and compensated crystals, respectively. By way of percent error at the 41.6° F. above glycerine fill temperature, a gauge having a 15 psi range would incur 40 percent error with a prior art construction versus 0.55 percent error in accordance herewith for a factor on the order of 72. The latter relationships can likewise be represented graphically for illustrating internal pressure increase versus percent volume increase throughout the operating ranges.

Figure 2:
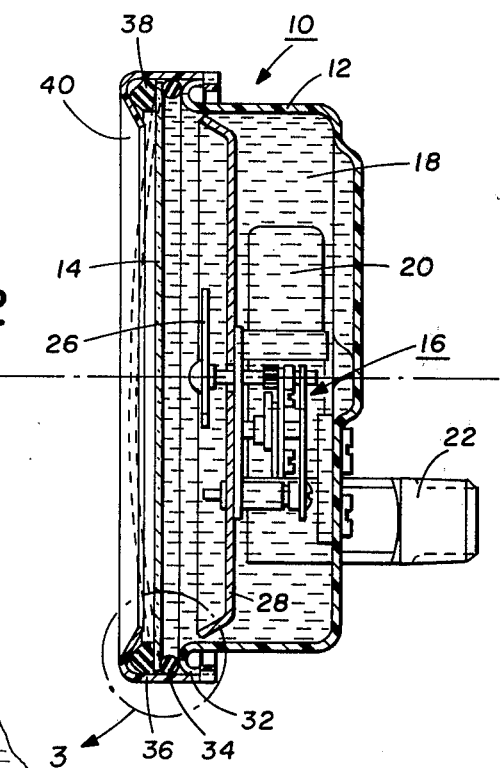
FIG. 2 is a sectional elevation taken substantially along the lines 2—2 of FIG. 1.
Figure 3:
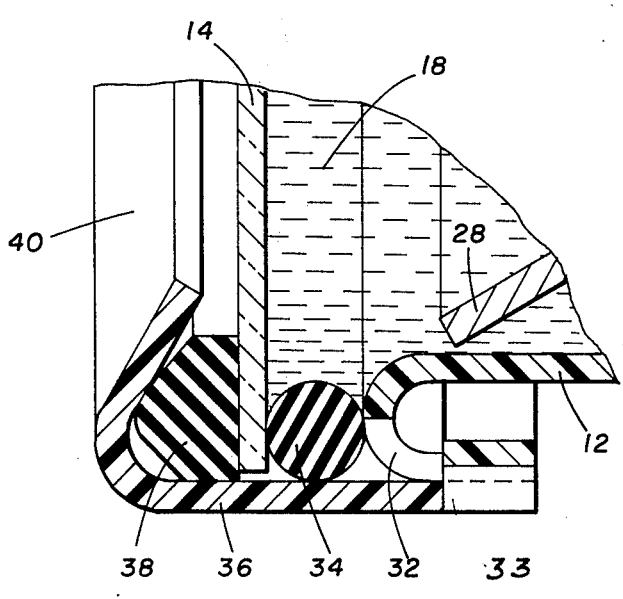
FIG. 3 is an enlarged fragmentary corner section of the encircled portion of FIG. 2.

In operation, fluid expansion and contraction is accommodated by bulging or contraction of crystal 14 as shown dashed in FIG. 2 without imposing a pressure buildup on the fluid.

By the above description there has been disclosed a novel temperature compensating structure for a liquid filled pressure gauge in which the enclosure crystal is selected to afford a controlled volumetric stiffness compensating against pressure changes otherwise induced by liquid expansion or contraction. By building these properties into an otherwise standard component of the gauge enclosure enabling it to perform a dual function, the previous expense of additional components in or on an over-size casing as in the prior art is substantially eliminated. On the other hand, it should be apparent that the invention hereof is not intended to be limited to having this feature incorporated into the crystal per se but can just as readily be contained in any portion of the casing whether it be the back, side or combination thereof and further need not be integral but can, for example, include a substitution of material such as a diaphragm or the like secured overlying cut-out portions thereof otherwise forming part of the enclosure for similar purposes as herein disclosed.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. In a casing for a fluid filled pressure gauge including a case and a crystal comprising walls supported forming a fluid-tight enclosure containing a pressure sensitive element extending to outward of the enclosure for receiving an internally applied pressure input, compensating means comprising said crystal to compensate against temperature induced volumetric changes incurred by the fluid fill, said crystal having a controlled volumetric stiffness substantially correlated to the anticipated temperature induced volumetric changes to be incurred by the fluid fill with a specific volume stiffness on the order of less than about 0.1 pounds per square inch per percent volume increase of the fluid fill.

2. In a casing according to claim 1 in which said crystal comprises a plastic composition.

3. In a pressure gauge comprising the combination of:
   a. a casing including a case and crystal comprising walls supported forming a fluid-tight enclosure;
   b. a fluid fill within said casing;
   c. a Bourdon tube within said casing extending to outward of said enclosure defining an input for receiving a pressure applied internally of said tube, said Bourdon tube being immersed in said fluid fill for operatively responding to pressure changes incurred by a pressure source received at said input; and
   d. compensating means comprising said crystal for operably compensating against temperature induced volumetric changes incurred by said fluid fill, said crystal having a controlled volumetric stiffness substantially correlated to the anticipated temperature induced volumetric changes to be incurred by the fluid fill with a specific volume stiffness on the order of less than about 0.1 pounds per square inch per percent volume increase of the fluid fill.

4. In a casing according to claim 3 in which said crystal comprises a plastic composition.

* * * * *